F. N. SPRAGUE.
COMBINATION BOW AND MULTIPLE CANTALIVER VEHICLE SPRING.
APPLICATION FILED APR. 6, 1915.

1,165,634.

Patented Dec. 28, 1915.

Witnesses:
G. Sargent Elliott.
Herbert L. Chase

Inventor:
Frank N. Sprague
By H. S. Bailey. Attorney

UNITED STATES PATENT OFFICE.

FRANK N. SPRAGUE, OF SEDGWICK, COLORADO.

COMBINATION BOW AND MULTIPLE CANTALIVER VEHICLE-SPRING.

1,165,634.                   Specification of Letters Patent.        Patented Dec. 28, 1915.

Application filed April 6, 1915. Serial No. 19,475.

*To all whom it may concern:*

Be it known that I, FRANK N. SPRAGUE, a citizen of the United States of America, residing at Sedgwick, county of Sedgwick, and State of Colorado, have invented a new and useful Combination Bow and Multiple Cantaliver Vehicle-Spring, of which the following is a specification.

This invention relates to improvements in a combination bow and multiple cantaliver vehicle spring and more particularly in springs designed for use in connection with automobiles and the like, the said invention being designed as an improvement upon a spring for which an application was allowed to me on the 25th day of September, 1914, bearing Serial No. 767,662, which application issued April 6, 1915, as Patent No. 1,134,927.

Figure 1:
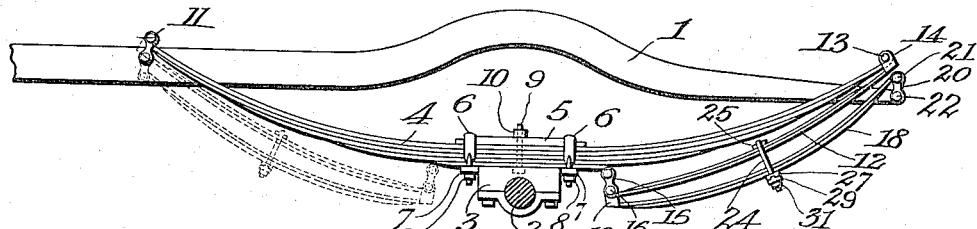
Figure 2:
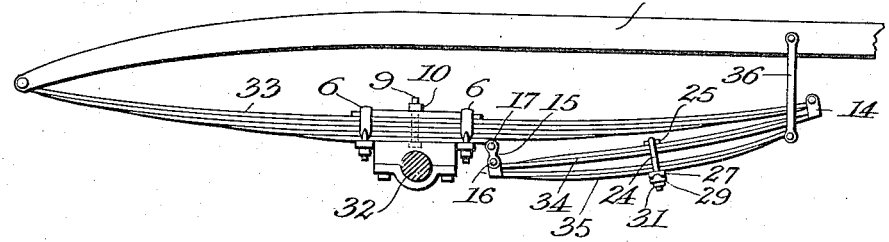
Figure 3:
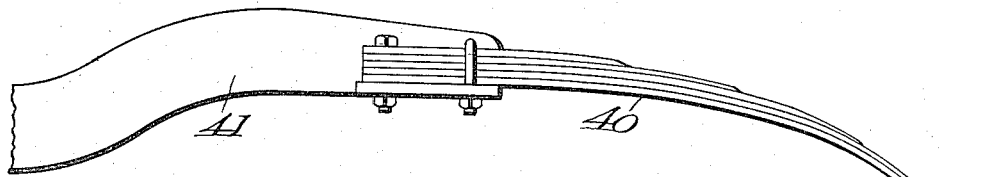
Figures 4, 5:
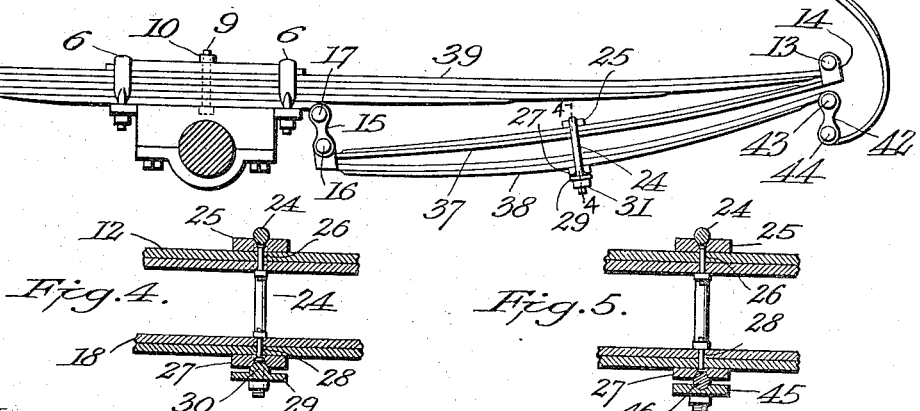

The object of the invention is to provide a spring of this character, which is so constructed that its resiliency is automatically increased or diminished to meet the demands of varying road and load conditions. Further, to provide in connection with a semi-elliptical or three-quarter elliptical spring, supplemental spring members so arranged and connected as to provide a spring of the cantaliver type, the resiliency whereof is automatically increased or diminished under varying load and road conditions, means being employed for manually determining the degree of stiffness under which the springs shall act. These objects are accomplished by the construction illustrated in the accompanying drawings, in which:

Figure 1, is a side elevation showing my improved supplemental spring used in connection with the ordinary semi-elliptical side spring, as applied to the rear axle of an automobile, the rear portion of one of the side bars of the chassis being shown in connection therewith. Fig. 2, is a similar view showing the arrangement of the spring as applied to the front axle and forward portion of the side bar of the chassis. Fig. 3, is a side view showing the supplemental spring used in connection with an ordinary three-quarter elliptical spring as applied to the rear axle of an automobile and the chassis. Fig. 4, is a vertical, transverse sectional view on the line 4—4 of Fig. 3. And Fig. 5, is a sectional view illustrating a modification in the fulcrum.

Similar letters of reference refer to similar parts throughout the several views.

Referring to the accompanying drawings, the numeral 1 indicates a portion of one of the side bars of the frame or chassis of an automobile, the said bar being arranged at its rear end to accommodate a semi-elliptical spring of the usual type.

2 refers to the rear axle; 3 refers to a spring seat of the usual type, which is bolted thereon.

4 refers to a semi-elliptical spring, which rests upon the said seat.

5 refers to a plate having stepped ends, which rests upon the top leaf of the spring; and 6 refers to U-clips which rest upon the said stepped ends of the plate 5, the threaded end of said clips passing through ears 7, on the seat 3, and receiving nuts 8, by which the leaves of the spring are held together, and the whole clamped upon the seat. The spring leaves are further held against endwise movement by a bolt 9, which passes up through the leaves, and through the plate 5, and receives a nut 10. The forward end of the spring is connected to the upper end of links 11, the lower ends of which are pivotally connected to the side bar 1.

The construction and arrangement of the spring thus far described, is in no way different from springs of this character in common use. The opposite end of the spring, however, is not directly connected with the side bar but is indirectly connected therewith by supplemental springs which coöperate with the main spring to provide the maximum of resiliency without increasing the length of the spring or diminishing its strength, the arrangement of said supplemental springs being as follows: As above stated, the rear end of the main semi-elliptical spring is not attached to the side frame, and to this end of the spring is secured one end of a supplemental spring 12, which may be made up of a sufficient number of leaves to give it the required strength and stiffness, only two leaves however being illustrated. The connection is made by passing a bolt 13, through ears 14, formed on the under or longest leaf of the spring 12, and through the eyed end of upper or longest leaf of the main spring. The opposite end of the spring 12 is connected to links 15 by a bolt 16, the upper ends of said links being pivotally attached to the adjacent end of the lower leaf of the main spring, by a bolt 17, the said end of the spring being bent to form an eye to receive the said bolt. A spring 18, similar to the spring 12, is also supported at one end by the bolt 16, the upper or longer leaf of said spring having ears 19 through which the said bolt passes. The opposite end of the spring 18 is connected to the upper ends of links 20 by a bolt 21, and the lower ends of the links are pivotally connected to the side bar 1 by a bolt 22. The ends of the springs 12 and 18 are separated only by a short space, but the spring 18 has a slightly greater curve than the spring 12, whereby the space between them increases toward a point midway between their ends.

The stiffness of the springs 12 and 18 with respect to each other, is determined by an adjustable fulcrum, which determines the point beyond which the springs are spread under a load or under a jolt. This fulcrum comprises a U-bolt or clevis 24, the closed end of which rests in a transverse semicircular recess in a block 25, which is secured to the upper leaf of the spring 12, by a bolt 26, which passes through the block and through both leaves of the spring. A block 27 having a transverse semi-circular recess, is secured to the under leaf of the spring 18 by a bolt 28. A plate 29 having a blade or rib 30, rests against the under side of the block 26, the blade on said plate bearing in the recess of the block. The ends of the plate 29 are apertured to receive the threaded ends of the clevis 24, and upon these threaded ends of the clevis are screwed nuts 31, which bear against the under side of the plate 29. By adjusting nuts 31, the tension under which the springs 12 and 18 are held may be varied to obtain the requisite amount of stiffness to meet the required load conditions, as will be hereinafter more fully explained. The supplemental springs may also be used on the opposite or forward end of the main spring, as shown by dotted lines in Fig. 1, or they may if desired to be used in connection with both ends of the main spring.

In Fig. 2, I have illustrated the arrangement of the spring as applied to the forward axle 32. The main spring 33 in this case is similar to the spring 4 in Fig. 1, its forward end being secured in the usual manner, to the forward end of the side bar 1. The supplemental springs 34 and 35 in this case are in all respects similar to the corresponding springs 12 and 18 shown in Fig. 1, and are connected to the spring 33 in the same manner in which the springs 12 and 18 are connected to the spring 4. A link 36 of suitable length connects the rear end of the supplemental spring 35 with the side bar. The action of the front and rear springs however is precisely similar.

In Fig. 3, supplemental springs 37 and 38 are shown in connection with a three-quarter elliptical spring comprising a lower spring member 39, like the springs 4 and 33, and an upper spring member 40, which is secured at its inner end to the rear end of the side bar 41, in the usual manner in which such spring members are connected. The supplemental springs 37 and 38, in this adaptation, are secured to the main spring 39 in the same manner as in the case of the similar springs shown in Figs. 1 and 2. The rear end of the spring 38, however, carries depending links 42, which are connected thereto by a pivot bolt 43, and the under or longest leaf of the spring 40 is curved around and under the ends of the springs 37, 38 and 39, and is connected to the lower ends of the links 42 by a pivot bolt 44. The arrangement of the supplemental springs as illustrated is such that only the ends which are connected respectively with the end of the main spring and the side bar, are subjected to load strains, but the springs are bent or bowed thereby throughout their length, under such strains, the fulcrum 24 determining the point beyond which the said springs spread. Between the fulcrum and the fixed ends of the springs, the bowing of the springs causes them to approach each other, and finally to touch, when the jar or load is greater than that exerted under average conditions. Thus the full resiliency of the springs is exerted up to the point where they are bowed sufficiently, under jolt or load strains, to cause them to touch between the fulcrum and their fixed ends, after which their resiliency is checked or in other words the springs begin to stiffen, and this stiffening increases as the load strain increases from the fact that the added strain causes the springs to engage along a greater length of their surface, thus confining their spring action to the area between their point of contact and their outer ends. Under rebound, the supplemental springs exert a lifting power up to the point when the body of the vehicle reaches its normal level with respect to the main spring, when the outer end of the lower supplemental spring engages the end of the upper supplemental spring, which is bolted to the adjacent end of the main spring; the action of the supplemental springs then ceases, and the rebound is checked thereby, and absorbed entirely by the main spring. The fulcrum may be placed at any point between the ends of the supplemental springs, which will effect the best results, and by turning the nuts 31 to bring the supplemental springs closer together stiffer spring action is obtained, as closer proximity of the opposing faces of the said springs causes them to engage more quickly and before the springs are bowed, as greatly as they would necessarily be if they were farther apart. When closer together they also engage throughout a greater length under less curvature, thereby decreasing the full spring action or resiliency. By confining the springs at one end and holding them against spreading at an intermediate point between the fixed ends and the load sustaining ends, a spring of the cantaliver type is obtained and one in which the resiliency is automatically increased or diminished to meet the varying road and load conditions. The blocks which support the clevis or fulcrum and the plate 29 permit a slight rocking movement of the parts of the fulcrum with respect to one another, under the bending or bowing action of the springs.

In Fig. 4 I have shown a modification of the fulcrum, in which the plate 29 is dispensed with and a grooved block 45 is employed, similar to the blocks 25 and 28, through which the ends of the clevis extend. The groove in the block 25 faces the groove in the block 28, and a roll 46 is placed in these grooves, which permits the desired rocking movement of the parts.

Having described my invention, what I claim as new and desire to secure by Letters Patent, is:

1. The combination with a vehicle axle and side bar, of a main leaf spring secured substantially midway of its length to said axle and at one end to said side bar, a pair of supplemental springs which are connected at one end by a common bolt and links connecting said bolt with the under side of the main spring adjacent the axle, links and bolts connecting the free end of the under supplemental spring with the side bar, a bolt connecting the free end of the upper spring with the free end of the main spring, and means for preventing spreading of said springs beyond a predetermined intermediate point.

2. The combination with a vehicle axle and side bar, of a main leaf spring secured substantially midway of its length to said axle, a pair of spaced supplemental leaf springs secured at one end upon a common bolt, and links connecting said bolt with the main spring adjacent the axle, adjustable means for maintaining a given space between said springs at a point intermediate of their ends, means connecting the free end of the upper spring with the free end of the main spring, and means connecting the free end of the under spring with the side bar.

3. The combination with a vehicle axle and side bar, of a main leaf spring secured substantially midway of its length to said axle and at one end to said side bar, a pair of spaced supplemental springs secured at their inner ends upon a common bolt, and a link connection between said bolt and the under leaf of said main spring, adjustable means for binding said springs at a point intermediate of their ends, and means for securing the free ends of said springs respectively to the side bar and to the free end of the main spring.

4. The combination with a vehicle axle and side bar, of a main leaf spring secured substantially midway of its length to said axle and at one end to said side bar, a pair of spaced supplemental leaf springs secured upon a common bolt at their inner ends, and a link connection between said bolt and the main spring adjacent the axle, a fulcrum secured upon the springs at a point intermediate of their ends, and comprising a grooved block which is secured to the upper face of the upper spring, a grooved block secured to the lower face of the lower spring, a plate having a bead which rests in the groove of the lower block, a clevis the closed end of which rests in the groove of the upper block, while its threaded extremities extend through openings in the plate having the bead, and receives clamping nuts, a bolt connecting the free end of the upper spring with the free end of the main spring, and a bolt and link connection between the free end of the under spring and the side bar.

5. The combination with a vehicle axle and side bar, of a main leaf spring secured to said axle substantially midway of its length and hinged at one end to the side bar, a pair of supplemental leaf springs having the same general curve as the main spring and secured at their inner end on a common bolt, means for hinging said springs to the under side of the main spring, a hinge connection between the upper supplemental spring and one end of the main spring, a hinge connection between the other supplemental spring and the side bar, and a fulcrum secured around the supplemental springs intermediate of their ends, whereby load strain on the outer ends of said supplemental springs causes them to bend throughout their lengths whereby they are brought into engagement between their inner ends and the fulcrum thus causing a stiffening of their action in proportion to the strain.

In testimony whereof I affix my signature in presence of two witnesses.

FRANK N. SPRAGUE.

Witnesses:
G. SARGENT ELLIOTT,
HERBERT L. CHASE.